Aug. 23, 1927.  
C. R. SNYDER  
1,640,299  
ANTIGLARE DEVICE  
Filed June 28, 1924
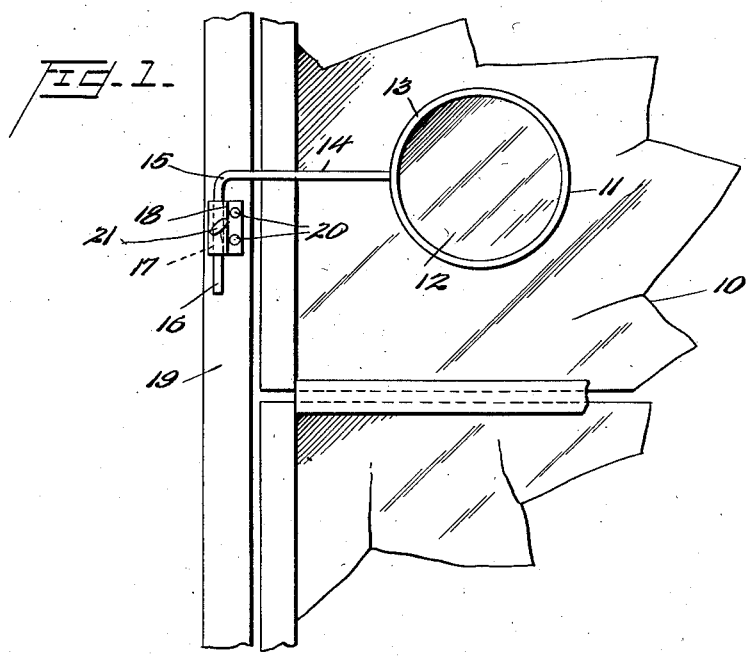
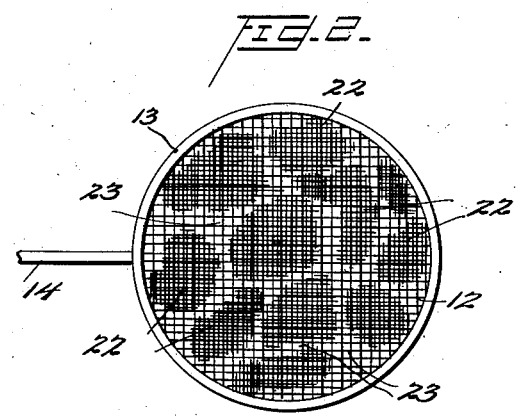
Inventor  
Claude R. Snyder  
By Watson, Coit, Morse & Grindle  
Attorneys Patented Aug. 23, 1927.

1,640,299

UNITED STATES PATENT OFFICE.

CLAUDE R. SNYDER, OF ELMIRA, NEW YORK.

ANTIGLARE DEVICE.

Application filed June 28, 1924. Serial No. 723,035.

This invention relates to an anti-glare device primarily intended for use on automobiles and is intended to afford the driver of such a vehicle protection from the glare of headlights of approaching vehicles and other sources of illumination or the rays of the sun, either direct or reflected.

An object of this invention is to provide an anti-glare shade for automotive vehicles which will prevent the glare of approaching lights from annoying the driver and yet at the same time allow him normal vision.

Another object of this invention is to provide a novel form of anti-glare device containing a glare screen which is irregularly spotted or shaded with translucent coloring matter in such a manner that there are small transparent spaces between the shaded portions, which themselves vary in translucency.

The invention may be understood from the following specification taken in conjunction with the accompanying drawings, wherein:

Figure 1 is an elevation of a portion of the windshield of an automobile showing the glare screen acording to this invention in position; and Figure 2 is an elevation on a larger scale of the glare shield.

Referring to the drawings, Figure 1 shows a portion 10 of the windshield of an ordinary automobile as viewed from the driver's seat. Located so as to be adjustable to a position to come between the driver's eyes and the lights of an approaching vehicle or other source of glare, is arranged the glare screen 11 which comprises a transparent disk 12 of glass, mica, celluloid or other suitable material having a surface suitably prepared as later described to reduce glare. This disk may be of any suitable shape, here shown as round, and is provided with a metallic rim 13 to which is attached a radially extending rod or wire 14 having a right angle bend 15 so as to provide a depending portion 16 in the plane of the disk.

The portion 16 is adapted to slide in a hole 17 provided in the bracket 18 which may be attached to the windshield stanchion 19 by any suitable means such as by the passage therethrough of bolts 20.

The vertical portion 16 of the supporting rod is adapted to be vertically adjustable within the bracket 18 and for that purpose there is provided a thumb-screw 21 to lock it in any desired position whereby the glare screen 11 may be vertically adjusted to suit the driver's height and the position of the annoying glare. The rod 14 may be formed of an easily bendable material in order that additional adjustments may be made to suit the requirements of various drivers. When it is not desired to use the screen, the thumb-screw 21 may be loosened and the screen swung aside, the portion 16 of the rod 14 rotating in the hole in the bracket 18.

The most valuable feature of this invention consists in the provision of a peculiar kind of coating for the transparent material forming the glare screen 11 as shown in Figure 2. This coating comprises a mottled or stippled arrangement so that there are provided irregular sized and shaped splotches 22 of dark pigment or coloring matter irregularly spaced over the surface of the screen and having between them wholly or partially transparent spaces 23. This effect may be obtained by smoking or by spraying coloring matter with an air-brush so that the spots or splotches of color are darkest at the center and taper off in shade to a point where the screen is almost transparent such as in the sections 23 between the larger splotches.

The coloring matter may be placed on one or both surfaces of the disk and protected by a suitable transparent varnish or an additional transparent disk may cover the colored surface to protect it.

The idea in providing a screen of this sort is to afford a number of transparent or nearly transparent spaces of small size through which the observer may watch an approaching car with the same acuteness of vision as if looking through the plain windshield, but the large number of dark splotches of color will prevent a sufficient amount of light coming through the screen to seriously effect the eye and render it incapable momentarily of observing the approaching vehicle. It should be noted that if one-half of the total area of the screen is completely opaque, then but one-half of the total amount of annoying light will impinge on the retina of the eye as would normally be the case if the screen were not in position, and yet by looking through one small transparent or nearly transparent space on the screen the observer will be entirely capable of noting the actions of the approaching vehicle at as great a distance as he normally would if the screen were not in position. The idea of having the area of the screen one-half opaque is only exemplary for any degree of opacity found desirable may be used.

From the above description it will be noted that there is provided by this invention a novel form of anti-glare device for use on automotive and other vehicles which does not render the driver incapable of properly observing the road or the approaching vehicle and yet renders the headlights of such a vehicle ineffective to momentarily blind the driver and while but one modification of the invention has been shown and described it is to be understood that the invention is not limited by the specific embodiment disclosed but is to be considered in the light of the following claim.

Having thus described my invention what I claim as new and desire to secure by Letters Patent is:

An anti-glare device for automotive vehicles adapted to be positioned between the driver's eyes and the source of glare comprising a disk of transparent material containing large irregular shaped and spaced spots of varying density of color.

In testimony whereof I hereunto affix my signature.

CLAUDE R. SNYDER.